4-DICYANOMETHYLENE-2-[(3-ETHYL-2(3H)-BENZOTHIAZO-LYLIDENE) METHYL]-6-METHYL-4H-PYRAN

4-DICYANOMETHYLENE-2-METHYL-6-[(1,3,3-TRIMETHYL-2(3H)-INDOLYLIDENE) PROPENYL]-4H-PYRAN 1,3-DIETHYL-5-{2-[(1-ETHYL-2(1H)-NAPHTHO[1,2]THIAZO-LYLIDENE) PROPENYL]-6-METHYL-4H-PYRAN-4-YLIDENE} BARBITURIC ACID

United States Patent Office 2,965,486
Patented Dec. 20, 1960

2,965,486

POLYMETHINE SENSITIZING DYES AND PHOTOGRAPHIC EMULSIONS

Leslie G. S. Brooker and Frank Glenn Webster, Rochester, N.Y., assignors to Eastman Kodak Company, Rochester, N.Y., a corporation of New Jersey Filed June 2, 1958, Ser. No. 739,121

13 Claims. (Cl. 96—105)

This invention relates to novel polymethine dyes, methods for making such dyes, and photographic silver halide emulsions sensitized by means of such polymethine dyes.

Polymethine dyes, including merocyanine dyes, have been previously described wherein the molecule contains a variety of heterocyclic nuclei. We have now found a new class of polymethine dyes which contain a pyran ring as a part of the intracyclic chain. Many of these dyes are useful in increasing the sensitivity of photographic silver halide emulsions.

It is, therefore, an object of our invention to provide a new class of polymethine dyes containing a pyran ring. Another object is to provide methods for making such polymethine dyes. Still another object is to provide photographic silver halide emulsions spectrally sensitized with the new polymethine dyes of our invention. Other objects will become apparent from a consideration of the following description and examples.

Figure 1:
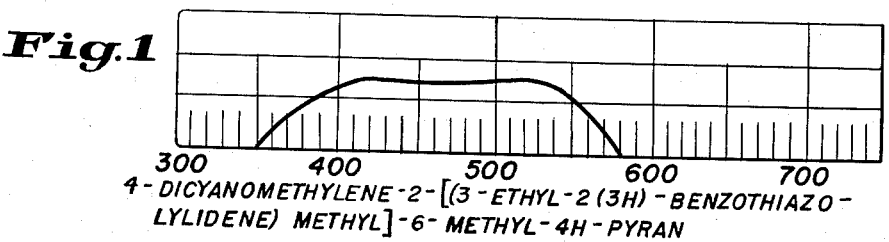
Figure 2:
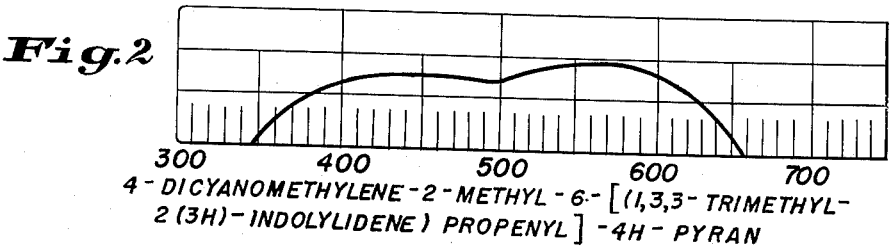
Figure 3:
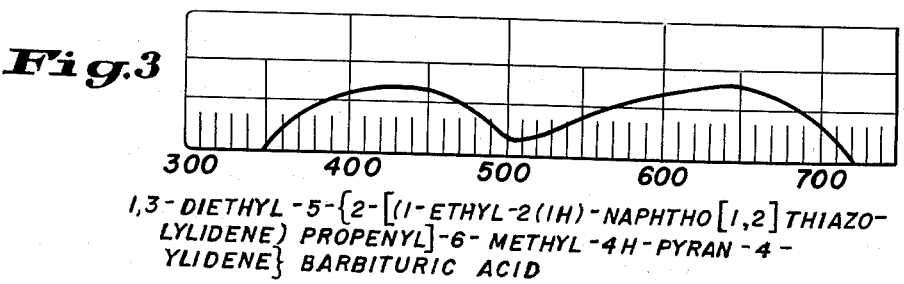

Our new polymethine dyes are frequently useful in sensitizing photographic silver halide emulsions, and the effect of three of the dyes of our invention in conventional photographic silver halide emulsions is illustrated diagrammatically in Figures 1–3 of the accompanying drawing. Further details regarding this effect are given below.

The new polymethine dyes of our invention can advantageously be represented by the following general formula:

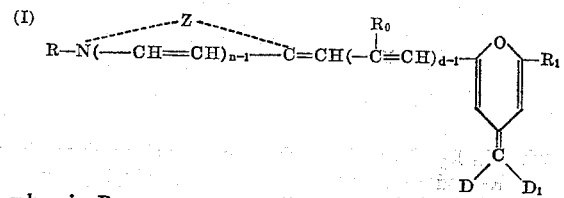

wherein R represents an alkyl group or alcohol radical (e.g., methyl, ethyl, n-propyl, n-butyl, isobutyl, n-amyl, isoamyl, β-methoxyethyl, β-ethoxyethyl, allyl (i.e., vinylmethyl), benzyl (phenylmethyl), β-phenylethyl, carboxymethyl, etc. (especially alkyl groups containing from 1 to 4 carbon atoms), $R_0$ and $R_1$ each represents a hydrogen atom, a lower alkyl group (e.g., methyl, ethyl, etc.), or an aryl group (e.g., phenyl, o, m- or p-tolyl, etc., especially a monocyclic aryl group of the benzene series), $d$ and $n$ each represents a positive integer of from 1 to 2, D and $D_1$ each represents a cyano group, or alternatively, D and $D_1$ together represent the non-metallic atoms necessary to complete an indandione nucleus (e.g., 1,3-diketohydrindene, etc.), or a heterocyclic nucleus containing from 5 to 6 atoms in the heterocyclic ring, such as a pyrazolinone nucleus (e.g., 3-methyl-1-phenyl-2-pyrazolin-5-one, 1-phenyl-2-pyrazolin-5-one, 1-(2-benzothiazolyl)-3-methyl-2-pyrazolin-5-one, etc.), an isoxazolinone nucleus (e.g., 3-phenyl-2-isoxazolin-5-one, 3-methyl-2-isoxazolin-5-one, etc.), an oxindole nucleus (e.g., 1-alkyl-2,3-dihydro-2-oxindoles, etc.), a 2,4,6-triketohexahydropyrimidine nucleus (e.g., barbituric acid or 2-thiobarbituric acid, as well as their 1-alkyl (e.g., 1-methyl, 1-ethyl, 1-n-propyl, 1-n-heptyl, etc.), or 1,3-dialkyl (e.g., 1,3-dimethyl, 1,3-diethyl, 1,3-di-n-propyl, 1,3-diisopropyl, 1,3-dicyclohexyl, 1,3-di(β-methoxyethyl), etc.), or 1,3-diaryl (e.g., 1,3-diphenyl, 1,3-di(p-chlorophenyl), 1,3-di(p-ethoxycarbonylphenyl), etc.), or 1-aryl (e.g., 1-phenyl, 1-p-chlorophenyl, 1-p-ethoxycarbonylphenyl, etc.), or 1-alkyl-3-aryl (e.g., 1-ethyl-3-phenyl, 1-n-heptyl-3-phenyl, etc.) derivatives), a rhodanine nucleus (i.e., 2-thio-2,4-thiazolidinedione nucleus), such as rhodanine, 3-alkylrhodanines (e.g., 3-ethylrhodanine, 3-allylrhodanine, etc.), or 3-arylrhodanines (e.g., 3-phenylrhodanine, etc.), etc., a 2-thio-2,4-oxazolidinedione nucleus (i.e., a 2-thio-2,4(3H,5H)-oxazoledione nucleus) (e.g., 3-ethyl-2-thio-2,4-oxazolidinedione, etc.), a thianaphthenone nucleus (e.g., 3(2H)-thianaphthenone, etc.), a 2-thio-2,5-thiazolidinedione nucleus (i.e., a 2-thio-2,5(3H,4H)-thiazolidinedione nucleus) (e.g., 3-ethyl-2-thio-2,5-thiazolidinedione, etc.), a 2,4-thiazolidinedione nucleus (e.g., 2,4-thiazolidinedione, 3-ethyl-2,4-thiazolidinedione, 3-phenyl-2,4-thiazolidinedione, 3-α-naphthyl-2,4-thiazolidinedione, etc.), a thiazolidinone nucleus (e.g., 4-thiazolidinone, 3-ethyl-4-thiazolidinone, 3-phenyl-4-thiazolidinone, 3-α-naphthyl-4-thiazolidinone, etc.), a 4-thiazolinone nucleus (e.g., 2-ethylmercapto-5-thiazolin-4-one, 2-alkylphenylamino-5-thiazolin-4-ones, 2-diphenylamino-5-thiazolin-4-one, etc.), a 2-imino-2-oxazolin-4-one (i.e., pseudohydantoin) nucleus, a 2,4-imidazolidinedione (hydantoin) nucleus (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1-ethyl-3-α-naphthyl-2,4-imidazolidinedione, 1,3-diphenyl-2,4-imidazolidinedione, etc.), a 2-thio-2,4-imidazolidinedione (i.e., 2-thiohydantoin) nucleus (e.g., 2-thio-2,4-imidazolidinedione, 3-ethyl-2-thio-2,4-imidazolidinedione, 3-phenyl-2-thio-2,4-imidazolidinedione, 3-α-naphthyl-2-thio-2,4-imidazolidinedione, 1,3-diethyl-2-thio-2,4-imidazolidinedione, 1-ethyl-3-phenyl-2-thio-2,4-imidazolidinedione, 1-ethyl-3-α-naphthyl-2-thio-2,4-imidazolidinedione, 1,3-diphenyl-2-thio-2,4-imidazolidinedione, etc.), a 2-imidazolin-5-one nucleus (e.g., 2-n-propylmercapto-2-imidazolin-5-one, etc.), etc. (especially a heterocyclic nucleus containing 5 atoms in the heterocyclic ring, 3 of said atoms being carbon atoms, 1 of said atoms being a nitrogen atom and 1 of said atoms being selected from the group consisting of a nitrogen atom, an oxygen atom, and a sulfur atom), and Z represents the non-metallic atoms necessary to complete a heterocyclic nucleus containing from 5 to 6 atoms in the heterocyclic ring, such as those selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., naphtho[1,2]thiazole, naphtho[2,1]thiazole, 5-methoxynaphtho[2,1]thiazole, 5-ethoxynaphtho[2,1]thiazole, 8-methoxynaphtho[1,2]thiazole, 7-methoxynaphtho[1,2]thiazole, etc.), a thianaphtheno-7′,6′,4,5-thiazole nucleus (e.g., 4′-methoxythianaphtheno-7′,6′,4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), a naphthoxazole nucleus (e.g., naphtho[1,2]oxazole, naphtho[2,1]oxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., naphtho[1,2]selenazole, naphtho[2,1]selenazole, etc.), a thiazoline nucleus (e.g., thiazoline, 4-methylthiazoline, etc.), a 2-quinoline nucleus (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), a 4-quinoline nucleus (e.g., quinoline, 6-methoxyquinoline, 7-methylquinoline, 8-methylquinoline, etc.), a 1-isoquinoline nucleus (e.g., isoquinoline, 3,4-dihydroisoquinoline, etc.), a benzimidazole nucleus (e.g., 1,3-diethylbenzimidazole, 1-ethyl-3-phenylbenzimidazole, etc.), a 3,3-dialkylindolenine nucleus (e.g., 3,3-dimethylindolenine, 3,3,5-trimethylindolenine, 3,3,7-trimethylindolenine, etc.), a 2-pyridine nucleus (e.g., pyridine, 5-methylpyridine, etc.), a 4-pyridine nucleus (e.g., pyridine, etc.), etc.

The polymethine dyes represented by Formula I above can advantageously be prepared by condensing a compound selected from those represented by the following general formula:

(II)

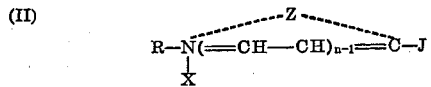

$$R-N(\!\!=\!\!CH\!-\!CH)_{n-1}\!\!=\!\!C-J$$
$$\phantom{R-N}|\phantom{(\!\!=\!\!CH\!-\!CH)_{n-1}\!\!=\!\!C-}$$
$$\phantom{R-N}X$$

wherein R, n and Z each have the values given above, X represents an acid radical, such as chloride, bromide, iodide, perchlorate, thiocyanate, benzenesulfonate, p-toluenesulfonate, methylsulfate, ethylsulfate, etc., and J represents an electronegative group, such as:

(IIa)   —S—R$_2$ wherein R$_2$ represents an alkyl group (e.g., methyl, ethyl, etc.) or an aryl group (e.g., phenyl, tolyl, etc.), or:

(IIb)   —CH=CH—N—R$_3$
                      |
                      R$_4$ wherein R$_3$ represents an acyl group (e.g., acetyl, propionyl, butyryl, benzoyl, etc.), and R$_4$ represents an aryl group (e.g., phenyl, tolyl, etc.), or:

(IIc)   —CH=C—S—R$_2$
                |
                R$_0$ wherein R$_0$ and R$_2$ each have the values given above, together with a compound selected from those represented by the following general formula:

(III)

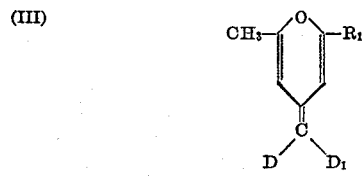

wherein R$_1$, D and D$_1$ each have the values given above.

In general, the condensations of the compounds of Formula II with those of Formula III can be carried out using approximately equimolar amounts of these two reagents. Larger amounts of one or the other of these ingredients can be employed in order to accelerate the reaction, although when R$_1$ of the intermediates of Formula III represents a methyl group, it has been found that use of an excess of the intermediates of Formula II frequently leads to continued reaction so that a new class of dyes represented by the following general formula is formed:

(IV)

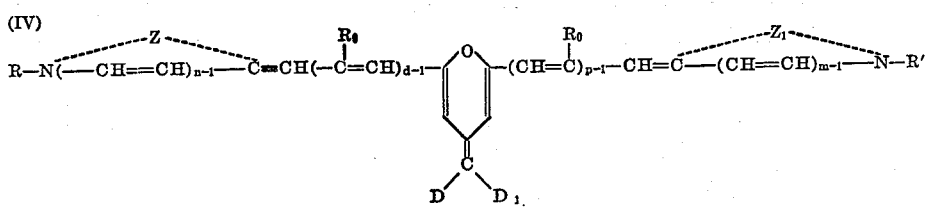

wherein R, R$_0$, d, n, D, D$_1$ and Z each have the values given above, p and m each represents a positive integer of from 1 to 2, R' represents an alkyl group, such as those illustrated above for R (R' can be the same or different from R), and Z$_1$ has values such as those illustrated above for Z (Z$_1$ can be the same or different from Z). As can be seen by reference to Formula IV, the reaction of a second molecule of the intermediate of Formula II with the methyl group of the dyes represented by Formula I need not be carried out under such conditions that the second molecule of the intermediates of Formula II is identical to the first molecule of the intermediates of Formula II reacted with the intermediates of Formula III, i.e., varied intermediates of Formula II can be used for the reaction with the dyes of Formula I. This latter reaction leads to the formation of unsymmetrical dyes.

We have also found that the intermediates of Formula III can be reacted with an aromatic aldehyde, such as p-dimethylaminobenzaldehyde, p-diethylaminobenzaldehyde, etc. to provide dyes represented by the following general formula:

(V)

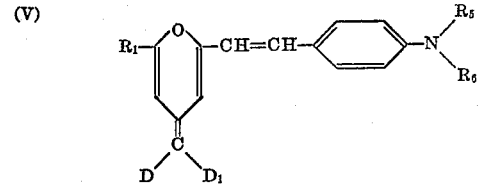

wherein R$_1$, D and D$_1$ each have the values given above, and R$_5$ and R$_6$ each represents a lower alkyl group, such as methyl, ethyl, etc.

The condensations of the cyclammonium quaternary salts of Formula II with the intermediates represented by Formula III, or with the dyes of Formula I where R$_1$ represents a methyl group, or with an aromatic aldehyde, can be accelerated by the addition of basic condensing agents to the reaction mixture. Typical basic condensing agents include the trialkylamines (e.g., triethylamine, tri-n-propylamine, triisopropylamine, tri-n-butylamine, etc.), N,N-dialkylanilines (e.g., N,N-dimethylaniline, N,N-diethylaniline, etc.), N-alkylpiperidines (e.g., N-methylpiperidine, N-ethylpiperidine, etc.), etc. The condensations can be carried out in the presence of an inert diluent, such as the lower alcohols (e.g., ethanol, n-propanol, isopropanol, n-butanol, etc.), 1,4-dioxane, diethyl ether, benzene, pyridine, quinoline, etc. The afore-mentioned condensations involving the intermediates of Formula II can also be accelerated by the addition of heat to the reaction mixture. In general, temperatures varying from room temperatures (ca. 25° C.) to the reflux temperature of the reaction mixture can be employed.

The intermediates of Formula III above can advantageously be prepared by condensing a compound selected from those represented by the following general formula:

(VI)
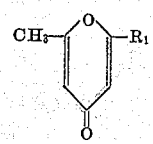

wherein $R_1$ has the values given above with an intermediate represented by the following general formula:

(VII)

wherein D and $D_1$ each have the values given above. The condensation of the intermediates of Formula VI with those of Formula VII can advantageously be carried out in the presence of a dehydrating agent, such as a carboxylic anhydride (e.g., acetic anhydride, butyric anhydride, etc. (or some other suitable dehydrating agent). The condensations can also be accelerated by heating the reaction mixture. Temperatures up to and including the reflux temperature of the reaction mixture have been found quite useful for the purposes of our invention.

The following examples will serve to illustrate more fully the method of making the intermediates and dyes of our invention. The examples also illustrate the useful sensitizing effect exhibited by many of the dyes of our invention.

The following examples will serve to illustrate more fully the manner of practicing our invention.

*Example 1.—5-(2,6-dimethyl-4H-pyran-4-ylidene)1,3-diethylbarbituric acid*

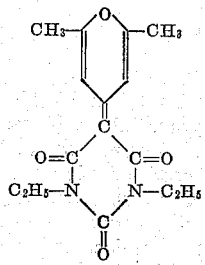

A mixture of 24.8 g. (1 mol.) of 2,6-dimethyl-4H-pyran-4-one, 36.8 g. (1 mol.) of 1,3-diethylbarbituric acid and 100 ml. of acetic anhydride was heated at the refluxing temperature for 15 minutes. The reaction mixture was chilled, the solid was collected on a filter and transferred to a beaker containing methanol. After stirring, the suspension was filtered and the intermediate was washed with methanol. The pale orange-yellow needles were obtained in a yield of 69% and they melted at 196–197° C.

*Example 2.—1,3-diethyl-5-(2-methyl-6-phenyl-4H-pyran-4-ylidene)-barbituric acid*

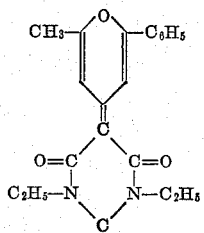

A mixture of 4.7 g. (1 mol.) of 2-methyl-6-phenyl-4H-pyran-4-one, 4.55 g. (1 mol.) of 1,3-diethylbarbituric acid and 10 ml. of acetic anhydride was heated at the refluxing temperature for 5 minutes. After chilling, 200 ml. of ether were added. The solid was collected on a filter and transferred to a beaker containing 200 ml. of ether. The suspension was filtered and the intermediate was washed with ether. The yellow powder was obtained in a yield of 62% and it melted at 193–194° C.

*Example 3.—4-dicyanomethylene-2,6-dimethyl-4H-pyran*

A mixture of 24.8 g. (1 mol.) of 2,6-dimethyl-4H-pyran-4-one, 14.5 g. (1 mol. plus 10% excess) of malononitrile and 100 ml. of acetic anhydride was heated at the refluxing temperature for 15 minutes. After chilling, the solid was collected on a filter, transferred to a beaker containing ethanol. After stirring, the suspension was filtered and the intermediate was washed with ethanol. The pale brown plates were obtained in a yield of 55% and they melted at 187–188° C.

*Example 4.—4-dicyanomethylene - 2 - methyl - 6-phenyl-4H-pyran*

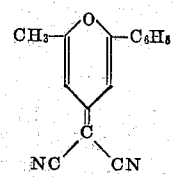

A mixture of 5.25 g. (1 mol.) of 2-methyl-6-phenyl-4H-pyran-4-one, 1.86 g. (1 mol.) of malononitrile and 10 ml. of acetic anhydride was heated at the refluxing temperature for 5 minutes. After chilling, 200 ml. of ether were added. The solid was collected on a filter and transferred to a beaker containing 200 ml. of ether. The suspension was filtered and the intermediate was washed with ether. The brown needles were obtained in a yield of 62% and they melted at 179–180° C.

*Example 5.—5 - (2,6-dimethyl-4H-pyran - 4-ylidene)-1, 3-diethyl-2-thiobarbituric acid*

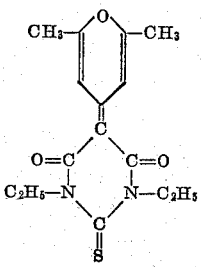

A mixture of 24.8 g. (1 mol.) of 2,6-dimethyl-4H-pyran-4-one, 40.0 g. (1 mol.) of 1,3-diethyl-2-thiobarbituric acid and 100 ml. of acetic anhydride was heated at the refluxing temperature for 15 minutes. The reaction mixture was chilled, the solid was collected on a filter and transferred to a beaker containing methanol. After stirring, the suspension was filtered and the intermediate was washed with methanol. The orange needles were obtained in a yield of 62% and they melted at 190–191° C.

*Example 6.—4-(2,6-dimethyl - 4H - pyran-4-ylidene)-3-phenyl-2-isoxazolin-5-one*

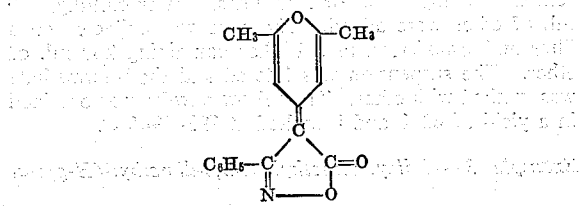

A mixture of 12.4 g. (1 mol.) of 2,6-dimethyl-4H-pyran-4-one, 16.2 g. (1 mol.) of 3-phenyl-2-isoxazolin-5-one and 50 ml. of acetic anhydride was heated at the refluxing temperature for 30 minutes. The reaction mixture was chilled, the solid was collected on a filter, washed with ether and transferred to a beaker containing methanol. After stirring, the suspension was filtered and the intermediate was washed with methanol. The amber crystals were obtained in a yield of 45% and they melted at 192–194° C.

*Example 7.—4 - (2,6 - dimethyl - 4H-pyran-4-ylidene)-3-methyl-1-phenyl-2-pyrazolin-5-one*

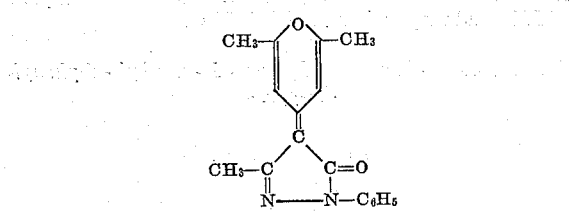

A mixture of 12.4 g. (1 mol.) of 2,6-dimethyl-4H-pyran-4-one, 17.4 g. (1 mol.) of 3-methyl-1-phenyl-2-pyrazolin-5-one and 50 ml. of acetic anhydride was heated at the refluxing temperature for 30 minutes. After chilling, the solid was collected on a filter and transferred to a beaker containing ether. After stirring, the suspension was filtered and the intermediate was washed with ether. The orange needles were obtained in a yield of 26% and they melted at 215–216° C.

*Example 8.—4 - dicyanomethylene - 2 - [(3-ethyl-2(3H)-benzothiazolylidene)-methyl] - 6-methyl-4H-pyran*

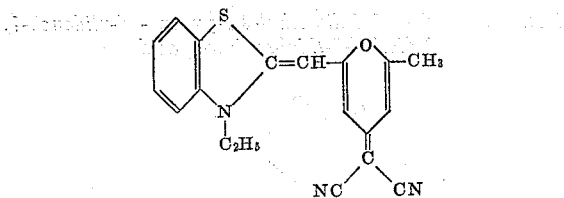

A mixture of 0.86 g. (1 mol.) of 4-dicyanomethylene-2,6-dimethyl-4H-pyran, 3.84 g. (1 mol. plus 110% excess) of 3-ethyl-2 - ethylmercaptobenzothiazolium ethosulfate, 2.1 g. (1 mol. plus 320% excess) of triethylamine and 25 ml. of pyridine was heated at the refluxing temperature for 10 minutes. The reaction mixture was stirred in water, chilled and the water was decanted. The residue was stirred in methanol until crystalline, filtered and the solid was washed with methanol. The dye was dissolved in hot pyridine, the solution was filtered, methanol was added, and after chilling the dye was collected on a filter and washed with methanol. After another such purification the yield of dye was 18%. The red crystals with a silver reflex had a M.P. of 299–300° C. with decomposition and they sensitized a photographic gelatino-silver-bromoiodide emulsion to about 585 mμ with a maximum sensitivity at about 525 mμ.

*Example 9.—4 - dicyanomethylene - 2 - [(1-ethyl-2(1H)-naphtho[1,2] - thiazolylidene)methyl] - 6 - methyl-4H-pyran*

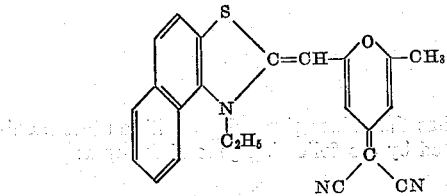

A mixture of 0.86 g. (1 mol.) of 4-dicyanomethylene-2,6-dimethyl-4H-pyran, 4.4 g. (1 mol. plus 110% excess) of 1-ethyl-2-ethylmercaptonaphtho[1,2]thiazolium-ethosulfate, 2.1 g. (1 mol. plus 320% excess) of triethylamine and 25 ml. of pyridine was heated at the refluxing temperature for 10 minutes. The reaction mixture was stirred in methanol, and after chilling, the dye was collected on a filter and washed with methanol. The dye was dissolved in hot pyridine, the solution was filtered, methanol was added, and after chilling, the dye was collected on a filter and washed with methanol. After another such purification, the yield of dye was 5%. The light red crystals had a M.P.>300° C. and they sensitized a photographic gelatino-silver-bromoiodide emulsion to about 575 mμ with a maximum sensitivity at about 540 mμ.

*Example 10.—4 - dicyanomethylene - 2-[(3-ethyl-2(3H)-benzothiazolylidene)propenyl] - 6 - methyl-4H-pyran*

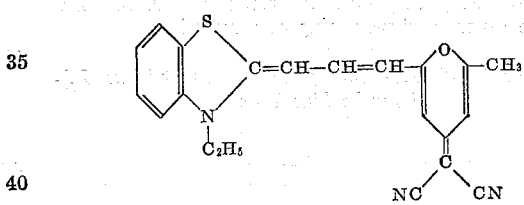

A mixture of 1.72 g. (1 mol.) of 4-dicyanomethylene-2,6-dimethyl-4H-pyran, 4.50 g. (1 mol.) of 2-(2-acetanilidovinyl) - 3 - ethylbenzothiazolium iodide, 1.1 g. (1 mol. plus 10% excess) of triethylamine and 25 ml. of pyridine was heated at the refluxing temperature for 10 minutes. The cool reaction mixture was stirred with ether. The ether was decanted and the residue was stirred in 200 ml. of hot methanol. The hot suspension was filtered and the solid was washed with methanol. After another such treatment the dye was dissolved in hot pyridine, the solution was filtered, methanol was added, and after chilling the dye was collected on a filter and washed with methanol. After another such purification, the yield of dye was 20%. The dark green needles had a M.P. of 270–271° C. with decomposition, and they sensitized a photographic gelatino-silver-bromoiodide emulsion to about 690 mμ with maximum sensitivity at about 610 mμ.

*Example 11.—4 - dicyanomethylene - 2-[(3-ethyl-2(3H)-benzoxazolylidene) - propenyl]-6-methyl - 4H-pyran*

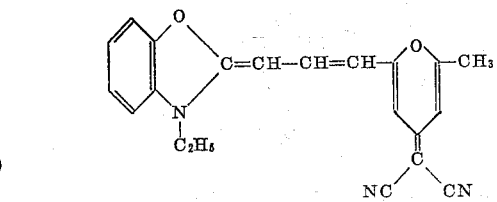

A mixture of 0.86 g. (1 mol.) of 4-dicyanomethylene-2,6-dimethyl-4H-pyran, 4.34 g. (1 mol. plus 100% excess) of 2 - (2 - acetanilidovinyl)-3-ethylbenzoxazolium iodide, 2.1 g. (1 mol. plus 110% excess) of triethylamine and 25 ml. of pyridine was heated at the refluxing temperature for 10 minutes. The reaction mixture was stirred in methanol, after chilling the dye was collected on a filter and washed with methanol. The dye was dissolved in hot pyridine, the solution was filtered, methanol was added, and after chilling the dye was collected on the filter and washed with methanol. After another such purification, the yield of dye was 6%. The steel blue needles had a M.P. of 244–245° C. with decomposition, and they sensitized a photographic gelatino-silver-bromoiodide emulsion to about 620 mμ with a maximum at about 590 mμ.

*Example 12.—4 - dicyanomethylene - 2-methyl-6-[(1,3,3-trimethyl - 2(3H) - indolylidene)propenyl] - 4H-pyran*

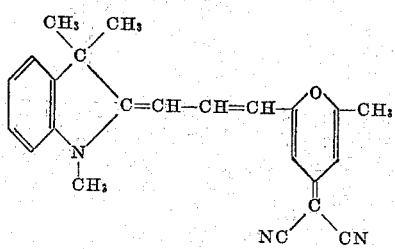

A mixture of 0.86 g. (1 mol.) of 4-dicyanomethylene-2,6-dimethyl-4H-pyran, 4.46 g. (1 mol. plus 100% excess) of 2-(2-acetanilidovinyl)-1,3,3-trimethylpseudoindolium iodide, 2.1 g. (1 mol. plus 110% excess) of triethylamine and 25 ml. of pyridine was heated at the refluxing temperature for 10 minutes. The reaction mixture was stirred in cold water, and after chilling the solid was collected on a filter and washed with methanol. The residue was stirred in hot methanol, and after chilling the dye was collected on a filter and washed with methanol. The dye was dissolved in hot pyridine, the solution was filtered, methanol was added and after chilling, the dye was collected on a filter and washed with methanol. After another such purification, the yield of dye was 9%. The green crystals with a coppery reflex had a M.P. of 272–273° C. with decomposition, and they sensitized a photographic gelatino-silver-bromoiodide emulsion to about 665 mμ with maximum sensitivity at about 580 mμ.

*Example 13.—4 - dicyanomethylene - 2-[(1-ethyl-2(1H)-quinolylidene) - propenyl] - 6 - methyl - 4H-pyran*

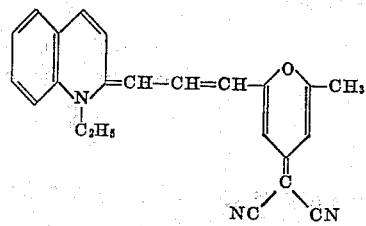

A mixture of 0.86 g. (1 mol.) of 4-dicyanomethylene-2,6-dimethyl-4H-pyran, 4.44 g. (1 mol. plus 100% excess) of 2-(2-acetanilidovinyl-1-ethylquinolinium iodide, 5 drops of acetic anhydride, 2.1 g. (1 mol. plus 110% excess) of triethylamine and 25 ml. of pyridine was heated at the refluxing temperature for 10 minutes. The reaction mixture was stirred in methanol, and after chilling the solid was collected on a filter and washed with methanol. The residue was stirred in 20 ml. of hot methanol, the hot suspension was filtered and the solid was washed with methanol. After another like treatment, the dye was dissolved in hot pyridine, the solution was filtered, methanol was added, and after chilling the dye was collected on the filter and washed with methanol. After another such purification, the yield of dye was 51%. The dark green crystals had a M.P. of 283–284° C. with decomposition, and they sensitized a photographic gelatino-silver-bromoiodide emulsion to about 715 mμ with maximum sensitivity at about 670 mμ.

*Example 14.—4-dicyanomethylene-2-p-dimethylaminostyryl-6-methyl-4H-pyran*

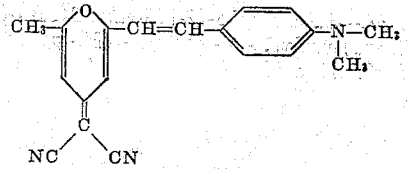

A mixture of 0.86 g. (1 mol.) of 4-dicyanomethylene-2,6-dimethyl-4H-pyran, 1.49 g. (1 mol. plus 100% excess) of p-dimethylaminobenzaldehyde, 2 drops of piperidine and 25 ml. of pyridine was heated at the refluxing temperature for 10 minutes. The reaction mixture was stirred in water, and after chilling the solid was collected on a filter and washed with methanol. After two recrystallizations from methanol, the yield of dye was 13%. The scarlet crystals had a M.P. of 212–214° C. with decomposition, and they sensitized a photographic gelatino-silver-bromoiodide emulsion to about 670 mμ with maximum sensitivity at about 560 mμ.

*Example 15.—4-dicyanomethylene-2-[(3-ethyl-2(3H)-benzothiazolylidene)methyl]-6-phenyl-4H-pyran*

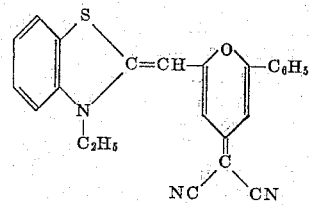

A mixture of 1.15 g. (1 mol.) of 4-dicyanomethylene-2-methyl-6-phenyl-4H-pyran, 2.63 g. (1 mol. plus 50%) of 1-ethyl-2-ethylmercaptobenzothiazolium ethosulfate, 0.6 g. (1 mol. plus 10% excess) of triethylamine and 15 ml. of pyridine was heated at the refluxing temperature for 10 minutes. The reaction mixture was stirred in methanol, and after chilling the solid was collected on a filter and washed with methanol. The dye was dissolved in hot pyridine, the solution was filtered, methanol was added, and after chilling the dye was collected on a filter and washed with methanol. After another such purification, the yield of dye was 30%. The felt of orange-red needles with a gold reflex had a M.P. >310° C., and they sensitized a photographic gelatino-silver-bromoiodide emulsion to about 600 mμ with maximum sensitivity at about 540 mμ.

*Example 16.—4-dicyanomethylene-2-[(3-ethyl-2(3H)-benzothiazolylidene)propenyl]-6-phenyl-4H-pyran*

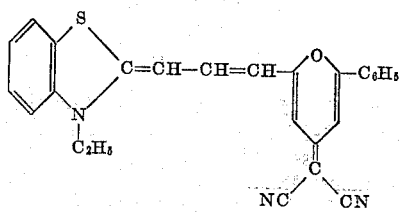

A mixture of 1.15 g. (1 mol.) of 4-dicyanomethylene-2-methyl-6-phenyl-4H-pyran, 2.25 g. (1 mol.) of 2-(2-acetanilidovinyl)-3-ethylbenzothiazolium iodide, 0.6 g. (1 mol. plus 10% excess) of triethylamine and 15 ml. of pyridine was heated at the refluxing temperature for 10 minutes. The reaction mixture was stirred in methanol, and after chilling the solid was collected on a filter and washed with methanol. The dye was dissolved in hot pyridine, the solution was filtered, methanol was added, and after chilling the dye was collected on a filter and washed with methanol. After another such purification, the yield of dye was 33%. The felt of dark needles had a M.P. of 258–258° C. with decomposition, and they sensitized a photographic gelatino-silver-bromoiodide emulsion to about 710 mμ with maximum sensitivity at about 530 mμ and 630mμ.

*Example 17.—1,3-diethyl-5-{2-[(3-ethyl-2(3H)-benzothiazolylidene)methyl] - 6 - methyl - 4H - pyran - 4 - ylidene}barbituric acid*

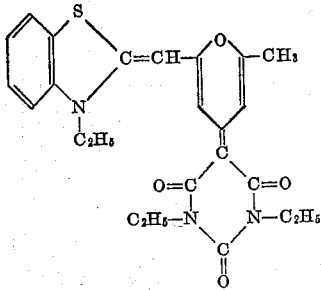

A mixture of 1.45 g. (1 mol.) of 5-(2,6-dimethyl-4H-pyran-4-ylidene)-1,3-diethylbarbituric acid, 5.24 g. (1 mol. plus 50% excess) of 3-ethyl-2-ethylmercaptobenzothiazolium ethosulfate, 2.1 g. (1 mol. plus 320%) of triethylamine and 25 ml. of pyridine was heated at the refluxing temperature for 10 minutes. The reaction mixture was stirred in water and the water was decanted. The residue was stirred in hot methanol and the solid was collected on a filter and washed with methanol. The dye was dissolved in hot pyridine, the solution was filtered, methanol was added, and after chilling the dye was collected on a filter and washed with methanol. After another such purification, the yield of dye was 27%. The red crystals with a silver reflex had a M.P. of 273–281° C. with decomposition, and they sensitized a photographic gelatino-silver-bromoiodide emulsion to about 620 mμ, with maximum sensitivity at about 540 mμ.

*Example 18.—1,3-diethyl-5-{2-[(1-ethyl-2(1H)-quinolylidene) - methyl] - 6 - methyl - 4H - pyran - 4 - ylidene}barbituric acid*

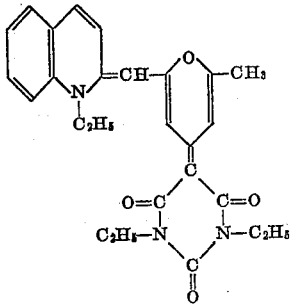

A mixture of 1.45 g. (1 mol.) of 5-(2,6-dimethyl-4H-pyran-4-ylidene)-1,3-diethylbarbituric acid, 4.81 g. (1 mol. plus 110% excess) of 1-ethyl-2-phenylmercaptoquinolinium p-toluenesulfonate, 2.1 g. (1 mol. plus 320% excess) of triethylamine and 25 ml. of pyridine was heated at the refluxing temperature for 10 minutes. The reaction mixture was stirred in water, the water was decanted and the residue was stirred in hot methanol. After chilling, the solid was collected on a filter and washed with methanol. The dye was dissolved in hot pyridine, the solution was filtered, methanol was added, and after chilling the dye was collected on a filter and washed with methanol. After another such purification, the yield of dye was 45%. The felt of dark green crystals had a M.P. of 249–250° C. with decomposition, and they sensitized a photographic gelatino-silver-bromoiodide emulsion to about 600 mμ and had a maximum sensitivity at about 590 mμ.

*Example 19.—1,3-diethyl-5-{2-[(3-ethyl-2(3H)-benzothiazolylidene) - propenyl]-6-methyl-4H-pyran-4-ylidene} barbituric acid*

A mixture of 1.45 g. (1 mol.) of 5-(2,6-dimethyl-4H-pyran-4-ylidene)-1,3-diethylbarbituric acid, 2.25 g. (1 mol.) of 2-(2-acetanilidovinyl)-3-ethylbenzothiazolium iodide, 0.6 g. (1 mol. plus 10% excess) of triethylamine and 25 ml. of pyridine was heated at the refluxing temperature for 10 minutes. The reaction mixture was stirred in methanol, and after chilling the solid was collected on a filter and washed with methanol. The residue was stirred in hot methanol, the hot suspension was filtered and the solid washed with methanol. The dye was dissolved in hot pyridine, the solution was filtered, methanol was added, and after chilling the dye was collected on a filter and washed with methanol. After another such purification, the yield of dye was 36%. The green crystals with a coppery reflex had a M.P. of 268–270° C. with decomposition, and they sensitized a photographic gelatino-silver-bromoiodide emulsion to about 700 mμ with a maximum sensitivity at about 625 mμ.

*Example 20.—1,3-diethyl-5-{2-[(3-ethyl-2(3H)-benzoxazolylidene) - propenyl]-6-methyl-4H-pyran-4-ylidene} barbituric acid*

A mixture of 1.45 g. (1 mol.) of 5-(2,6-dimethyl-4H-pyran-4-ylidene)-1,3-diethylbarbituric acid, 4.34 g. (1 mol. plus 100% excess) of 2-(2-acetanilidovinyl)-3-ethylbenzoxazolium iodide, 2.1 g. (1 mol. plus 320% excess) of triethylamine and 25 ml. of pyridine was heated at the refluxing temperature for 10 minutes. The reaction mixture was stirred in water, and after chilling the solid was collected on a filter and washed with water. The residue was stirred in hot methanol, the suspension was filtered hot and the dye was washed with methanol. The dye was dissolved in hot pyridine, the solution was filtered, methanol was added, and after chilling the dye was collected on a filter and washed with methanol. After another such purification, the yield of dye was 15%. The violet crystals had a M.P. of 265–267° C. with decomposition, and they sensitized a photographic gelatino-silver-bromoiodide emulsion to about 670 mμ with maximum sensitivity at about 620 mμ.

*Example 21.—1,3 - diethyl - 5 - {2-methyl-6-[(1,3,3-trimethyl - 2(3H) - indolylidene)propenyl]-4H-pyran-4-ylidene}barbituric acid*

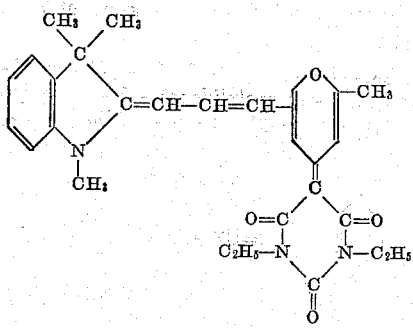

A mixture of 1.45 g. (1 mol.) of 5-(2,6-dimethyl-4H-pyran-4-ylidene)-1,3-diethylbarbituric acid, 4.46 g. (1 mol. plus 100% excess) of 2-(2-acetanilidovinyl)-1,3,3-trimethylpseudo-indolium iodide, 2.1 g. (1 mol. plus 320%) of triethylamine and 25 ml. of pyridine was heated at the refluxing temperature for 10 minutes. The reaction mixture was stirred in water, and after chilling the solid was collected on a filter and washed with water. The residue was stirred in hot methanol, the suspension was filtered hot and the dye was washed with methanol. The dye was dissolved in hot pyridine, the solution was filtered, methanol was added and after chilling the dye was collected on a filter and washed with methanol. After another such purification, the yield of dye was 9%. The shiny green crystals had a M.P. of 244-245° C. with decomposition.

*Example 22.—1,3 - diethyl-5-{2-[(1-ethyl-2(1H)-naphtho [1,2] - thiazolylidene)propenyl]-6-methyl-4H-pyran-4-ylidene}barbituric acid*

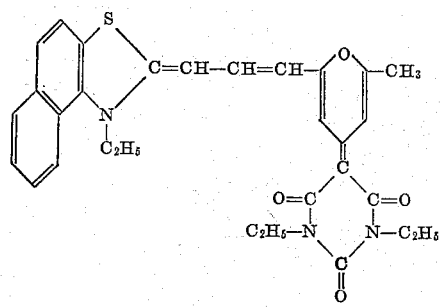

A mixture of 1.45 g. (1 mol.) of 5-(2,6-dimethyl-4H-pyran-4-ylidene)-1,3-diethylbarbituric acid, 5.44 g. (1 mol. plus 100% excess) of 2-(2-acetanilidovinyl)-1-ethyl-naphtho[1,2]-thiazolium p-toluenesulfonate, 1.02 g. (1 mol. plus 100% excess) of acetic anhydride, 2.1 g. (1 mol. plus 320% excess) of triethylamine and 25 ml. of pyridine was heated at the refluxing temperature for 10 minutes. The reaction mixture was stirred in methanol, and after chilling the residue was collected on a filter and washed with methanol. The solid was stirred in hot methanol, the suspension was filtered hot and the solid was washed with methanol. The dye was dissolved in hot pyridine, the solution was filtered hot, methanol was added, and after chilling the dye was collected on a filter and washed with methanol. After another such purification, the yield of dye was 36%. The coppery-green crystals had a M.P. of 226-227° C. with decomposition, and they sensitized a photographic gelatino-silver-bromoiodide emulsion to about 720 m$\mu$ with maximum sensitivity at about 650 m$\mu$.

*Example 23.—1,3-diethyl-5-(2-p-dimethylaminostyryl-6-methyl-4H-pyran-4-ylidene)barbituric acid*

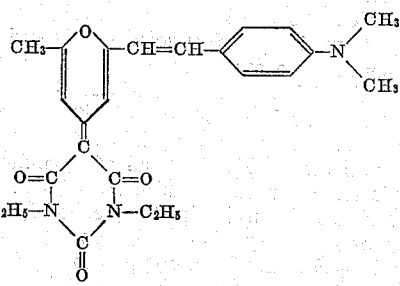

A mixture of 1.45 g. (1 mol.) of 5-(2,6-dimethyl-4H-pyran-4-ylidene)-1,3-diethylbarbituric acid, 1.49 g. (1 mol. plus 100% excess) of p-dimethylaminobenzaldehyde, 3 drops of piperidine and 25 ml. of pyridine was heated at the refluxing temperature for 10 minutes. The reaction mixture was stirred in water, and after chilling was collected on a filter and washed with water. After two recrystallizations from ethanol, the yield of dye was 10%. The orange-red crystals had a M.P. of 247-249° C. with decomposition and they sensitized a photographic gelatino-silver-bromoiodide emulsion to about 670m$\mu$ with maximum sensitivity at about 550 m$\mu$.

*Example 24.—1,3-diethyl-5-{2[(3-ethyl-2(3H) - benzothiazolylidene) - methyl] - 6 - phenyl - 4H - pyran - 4-ylidene}barbituric acid*

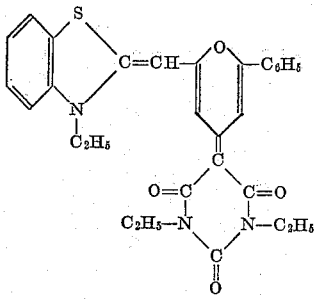

A mixture of 1.76 g. (1 mol.) of 1,3-diethyl-5-(2-methyl-6-phenyl-4H-pyran-4-ylidene)barbituric acid, 2.63 g. (1 mol. plus 50% excess) of 3-ethyl-2-ethylmercaptobenzothiazolium ethosulfate, 0.6 g. (1 mol. plus 10% excess) of triethylamine and 15 ml. of pyridine was heated at the refluxing temperature for 10 minutes. The reaction mixture was stirred in methanol, and after chilling the solid was collected on a filter and washed with methanol. The dye was dissolved in hot pyridine, the solution was filtered, methanol was added, and after chilling the solid was collected on a filter and washed with methanol. After another such purification, the yield of the dye was 47%. The felt of orange-red needles had a M.P. of 184-185° C. with decomposition, and they sensitized a a photographic gelatino-silver-bromoiodide emulsion to about 580m$\mu$ with maximum sensitivity at about 560 m$\mu$.

*Example 25.—1,3 - diethyl - 5{2-[(3-ethyl-2-(3H)-benzothiazolylidene)-propenyl] - 6 - phenyl - 4H - pyran - 4-ylidene}barbituric acid*

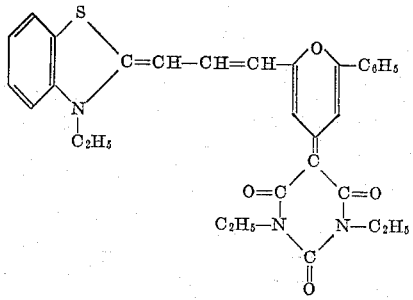

A mixture of 1.76 g. (1 mol.) of 1,3-diethyl-5-(2-methyl-6-phenyl-4H-pyran-4-ylidene)barbituric acid, 2.25 g. (1 mol.) of 2-(2-acetanilidovinyl)-3-ethylbenzothiazolium iodide, 0.6 g. (1 mol. plus 10% excess) of triethylamine and 15 ml. of pyridine was heated at the refluxing temperature for 10 minutes. The reaction mixture was stirred in methanol and after chilling the solid was collected on a filter and washed with methanol. The dye was dissolved in hot pyridine, the solution was filtered, methanol was added, and after chilling the dye was collected on a filter and washed with methanol. After another such purification the yield of dye was 42%. The felt of green crystals with a coppery reflex had a M.P. of 291–292° C. with decomposition, and they sensitized a photographic gelatino-silver-bromoiodide emulsion to about 710 mμ with a maximum sensitivity at about 650 mμ.

*Example 26.*—*1,3 - diethyl-5-{2-[(3-ethyl-2(3H)-benzothiazolylidene) - methyl] - 6 - methyl - 4H - pyran - 4-ylidene}-2-thiobarbituric acid*

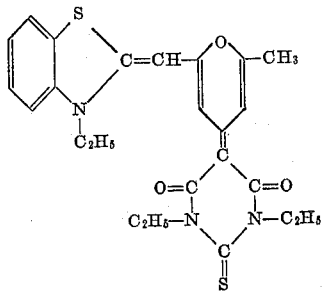

A mixture of 3.06 g. (1 mol.) of 5-(2,6-dimethyl-4H-pyran-4-ylidene)-1,3-diethyl-2-thiobarbituric acid, 5.24 g. (1 mol. plus 50% excess) of 3-ethyl-2-ethylmercaptobenzothiazolium ethosulfate, 1.1. g. (1 mol. plus 10% excess) of triethylamine, 25 ml. of pyridine was heated at the refluxing temperature for 10 minutes. The reaction mixture was stirred in methanol, and after chilling the solid was collected on a filter and washed with methanol. The dye was dissolved in hot pyridine, the solution was filtered, methanol was added, and after chilling the dye was collected on a filter and washed with methanol. After another such purification, the yield of dye was 33%. The felt of red needles had a M.P. of 282–283° C. with decomposition, and they sensitized a photographic gelatino-silver-bromoiodide emulsion to about 610 mμ. with maximum sensitivity at about 570 mμ.

*Example 27.*—*1,3 - diethyl - 5 - {2 - [(3 - ethyl - 2(3H)-benzothiazolylidene) - propenyl] - 6 - methyl - 4H-pyran-4-ylidene}-2-thiobarbituric acid*

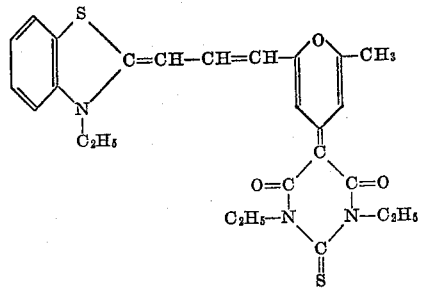

A mixture of 3.06 g. (1 mol.) of 5-(2,6-dimethyl-4H-pyran-4-ylidene)-1,3-diethyl-2-thiobarbituric acid, 4.5 g. (1 mol.) of 2-(2-acetanilidovinyl)-3-ethylbenzothiazolium iodide, 1.1 g. (1 mol. plus 10% excess) of triethylamine, and 25 ml. of pyridine was heated at the refluxing temperature for 10 minutes. The reaction mixture was stirred in methanol, and after chilling the solid was collected on a filter and washed with methanol. The dye was dissolved in hot pyridine, the solution was filtered, methanol was added, and after chilling the dye was collected on a filter and washed with methanol. After another such purification, the yield of dye was 51%. The felt of green crystals had a M.P. of 195–197° C. with decomposition, and they sensitized a photographic gelatino-silver-bromoiodide emulsion to about 730 mμ with maximum sensitivity at about 670 mμ.

*Example 28.*—*1,3 - diethyl - 5 - {2 - [(1 - ethyl - 2(1H)-naphtho[1,2] - thiazolylidene) - 2 - methylpropenyl]-6 - methyl - 4H - pyran - 4 - ylidene} - 2 - thiobarbituric acid*

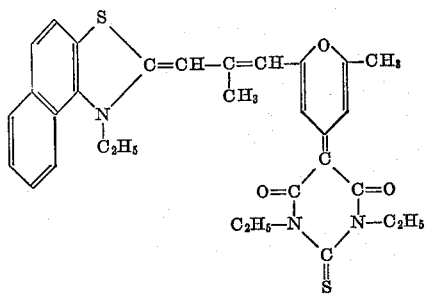

A mixture of 1.53 g. (1 mol.) of 5-(2,6-dimethyl-4H-pyran-4-ylidene)-1,3-diethyl-2-thiobarbituric acid, 2.7 g. (1 mol. plus 25% excess) of 1-ethyl-2-ethylmercaptopropenylnaphtho[1,2]-thiazolium ethosulfate, 0.6 g. (1 mol. plus 10% excess) of triethylamine and 25 ml. of pyridine was heated at the refluxing temperature for 10 minutes. The reaction mixture was stirred in methanol, and after chilling the solid was collected on a filter and washed with methanol. The dye was dissolved in pyridine, the solution was filtered, methanol was added and the solid was collected on a filter and washed with methanol. After another like treatment, the solid was stirred in 250 ml. hot methanol, the hot suspension was filtered and the solid was washed with methanol. After another such purification, the yield of dye was 4%. The dark crystals had a M.P. of 254–255° C. with decomposition, and they sensitized a photographic gelatino-silver-bromoiodide emulsion to about 740 mμ and had a maximum sensitivity at about 700 mμ.

*Example 29.*—*4 - {2 - methyl - 6 - [( 3 - methyl - 2(3H)-benzothiazolylidene) - methyl] - 4H - pyran - 4 - ylidene}-3-phenyl-2-isoxazolin-5-one*

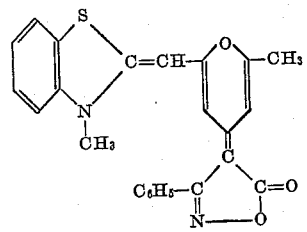

A mixture of 1.33 g. (1 mol.) of 4-(2,6-dimethyl-4H-pyran - 4 - ylidene) - 3 - phenyl - 2 - isoxazolin - 5 - one, 3.67 g. (1 mol. plus 100% excess) of 3-methyl-2-methylmercapto benzothiazolium p-toluenesulfonate, 1.01 g. (1 mol. plus 100% excess) of triethylamine and 25 ml. of pyridine was heated at the refluxing temperature for 10 minutes. The reaction mixture was stirred in a mixture of methanol and water, after chilling, the solid was collected on a filter and washed with methanol. The dye was dissolved in hot pyridine, the solution was filtered, methanol was added, and after chilling the dye was collected on a filter and washed with methanol. After another such purification, the yield of dye was 54%. The coppery crystals had a M.P. of 178–179° C. with decomposition, and they sensitized a photographic gelatino-silver-bromoiodide emulsion to about 620 mμ and had a maximum sensitivity at about 540 mμ.

*Example 30.—4 - {2-[(3 - ethyl - 2(3H) - benzothiazolylidene)propenyl] - 6 - methyl - 4H - pyran - 4-ylidene}-3-phenyl-2-isoxazolin-5-one*

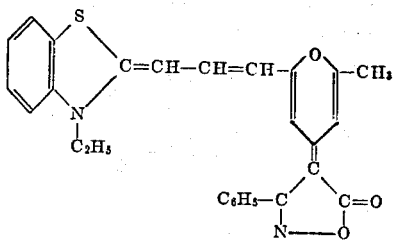

A mixture of 1.33 g. (1 mol.) of 4-(2,6-dimethyl-4H-pyran-4-ylidene)-3-phenyl-2-isoxazolin-5-one, 2.75 g. (1 mol.) of 2 - (2 - acetanilidovinyl) - 3 - ethylbenzothiazolium iodide, 0.6 g. (1 mol. plus 10%) of triethylamine and 25 ml. of pyridine was heated at the refluxing temperature for 10 minutes. The reaction mixture was stirred in methanol, and after chilling the solid was collected on a filter and washed with methanol. The dye was dissolved in hot pyridine, the solution was filtered, methanol was added, and the dye was collected on a filter and washed with methanol. After another such purification, the yield of dye was 11%. The dark crystals with a shiny reflex had a M.P. of 275–276° C. with decomposition.

*Example 31. — 4 - {2 - methyl - [(1,3,3-trimethyl-2(3H)-indolylidene) - propenyl] - 4H - pyran - 4 - ylidene} - 3-phenyl-2-isoxazolin-5-one*

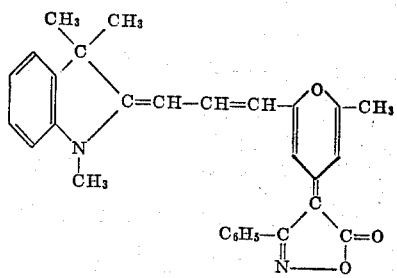

A mixture of 1.33 g. (1 mol.) of 4-(2,6-dimethyl-4H-pyran-4-ylidene)-3-phenyl-2-isoxazolin-5-one, 2.23 g. (1 mol.) of 1,3,3-trimethylpseudoindolium iodide, 0.6 g. (1 mol. plus 10% excess) of triethylamine, 25 ml. of pyridine was heated at the refluxing temperature for 10 minutes. The reaction mixture was stirred in water, the residue was stirred in hot methanol, and after chilling the solid was collected on a filter and washed with methanol. The dye was dissolved in hot pyridine, the solution was filtered, methanol was added, and after chilling the dye was collected on a filter and washed with methanol. After another such purification, the yield of dye was 4%. The dark green crystals had a M.P. of 157–158° C. with decomposition, and they sensitized a photographic gelatino-silver-bromoiodide emulsion to about 670 m$\mu$ and had a maximum sensitivity at about 620 m$\mu$.

*Example 32.—3-methyl - 4 - {2 - methyl - 6 - [(3-methyl-2(3H) - benzothiazolylidene) - methyl] - 4H - pyran-4-ylidene}-1-phenylpyrazolin-5-one*

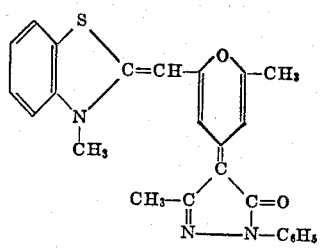

A mixture of 1.4 g. (1 mol.) of 4-(2,6-dimethyl-4H-pyran-4-ylidene)-3-methyl-1-phenyl-2-pyrazolin - 5 - one, 3.67 g. (1 mol. plus 100% excess) of 3 methyl-2-methylmercaptobenzothiazolium p-toluenesulfonate, 1.01 g. (1 mol. plus 100% excess) of triethylamine and 25 ml. of pyridine was heated at the refluxing temperature for 10 minutes. The reaction mixture was stirred in water, and after chilling the solid was collected on a filter and washed with water. The solid was stirred in methanol and the dye was collected on a filter and washed with methanol. The dye was dissolved in hot pyridine, the solution was filtered, methanol was added, and after chilling the dye was collected on a filter and washed with methanol. After another such purification, the yield of dye was 14%. The red crystals had a M.P. of 277–278° C. with decomposition, and they sensitized a photographic gelatino-silver-bromoiodide emulsion to about 600 m$\mu$ and had a maximum sensitivity of about 500 m$\mu$.

*Example 33.—4 - {2 - [(3 - ethyl - 2(3H)-benzothiazolylidene)propenyl]-6-methyl-4H-pyran - 4 - ylidene} - 3-methyl-1-phenyl-2-pyrazolin-5-one*

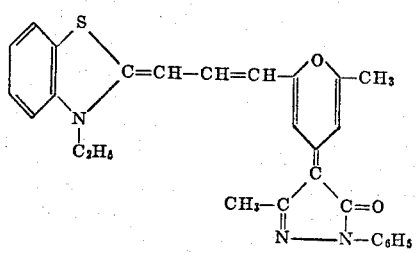

A mixture of 1.4 g. (1 mol.) of 4-(2,6-dimethyl-4H-pyran-4-ylidene)-3-methyl-1-phenyl-2-pyrazolin - 5 - one, 3.35 g. (1 mol. plus 50% excses) of 2-(2-acetanilidovinyl)-3-ethylbenzothiazolium iodide, 0.6 g. (1 mol. plus 10% excess) of triethylamine and 25 ml. of pyridine was heated at the refluxing temperature for 10 minutes. The reaction mixture was stirred in water, the water was decanted, the residue was stirred in hot methanol, and after chilling the solid was collected on a filter and washed with methanol. The dye was dissolved in hot pyridine, the solution was filtered, methanol was added, and after chilling the solid was collected on a filter and washed with methanol. After another such purification, the yield of dye was 2%. The dark crystals with a shiny reflex had a M.P. of 312–313° C. with decomposition, and they sensitized a photographic gelatino-silver-bromoiodide emulsion to about 620 m$\mu$ and had a maximum sensitivity at about 600 m$\mu$.

*Example 34.—1,3 - diethyl - 5 - {2,6 - di[(3-ethyl-2(3H)-benzothiazolylidene)propenyl]-4H-pyran - 4 - ylidene}-barbituric acid*

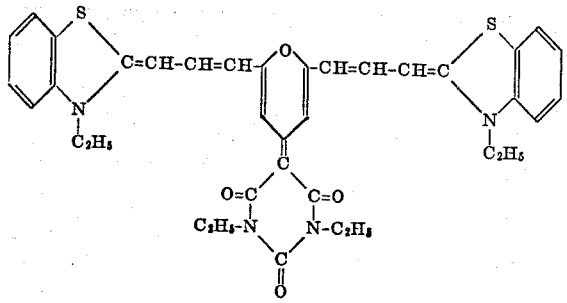

A mixture of 1.45 g. (1 mol.) of 5-(2,6-dimethyl-4H-pyran-4-ylidene)-1,3-diethylbarbituric acid, 4.50 g. (2 mol.) of 2-(2-acetanilidovinyl) - 3 - ethylbenzothiazolium iodide, 2.2 g. (2 mol. plus 120% excess) of triethylamine and 25 ml. of pyridine was heated at the refluxing temperature for 10 minutes. The reaction mixture was stirred in methanol, and after chilling the solid was collected on a filter and washed with methanol. After two recrystallization from pyridine, the yield of dye was 16%. The felt of dark crystals had a M.P. >300° C.

19

*Example 35.—1,3-diethyl-5-{2,6-di[(1-ethyl-2(1H)-quinolylidene)-propenyl]-4H-pyran - 4 - ylidene}barbituric acid*

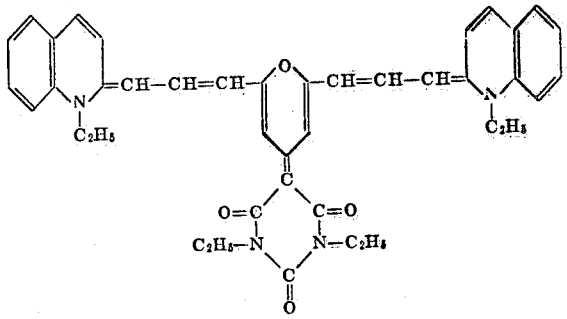

A mixture of 1.45 g. (1 mol.) of 5-(2,6 dimethyl-4H-pyran-4-ylidene)-1,3-diethylbarbituric acid, 4.44 g. (2 mol.) of 2-(2-acetanilidovinyl)-1-ethylquinolinium iodide, 2.2 g. (2 mol. plus 120% excess) of triethylamine, 1.02 g. (1 mol.) of acetic anhydride and 25 ml. of pyridine was heated at the refluxing temperature for 10 minutes. The reaction mixture was stirred in methanol, the solid was collected on a filter and washed with methanol. The solid was stirred in hot methanol, the suspension was filtered hot and the solid that was collected on the filter was washed with methanol. The dye was dissolved in hot pyridine, the solution was filtered hot, methanol was added, and after chilling the dye was collected on a filter and washed with methanol. After two recrystallizations from pyridine the yield of dye was 7%. The dark green crystals had a M.P. of 303–304° C. with decomposition, and they sensitized a photographic gelatino-silver-bromoiodide emulsion to about 770 mμ with a maximum sensitivity at about 575 mμ and 660 mμ.

*Example 36.—1,3-diethyl-5-{2,6-di[(1 - ethyl - 2 - (1H)-naphtho[1,2]-thiazolylidene)propenyl] - 4H - pyran-4-ylidene}-2-thiobarbituric acid*

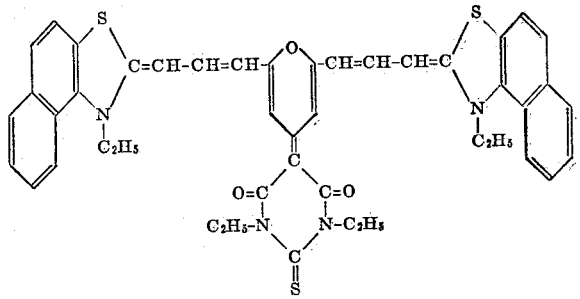

A mixture of 1.53 g. (1 mol.) of 5-(2,6-dimethyl-4H-pyran-4-ylidene)-1,3-diethyl-2-thiobarbituric acid, 5.44 g. (2 mol.) of 2-(2-acetanilidovinyl)-1-ethylnaphtho[1,2] thiazolium p-toluene-sulfonate, 1.1 g. (2 mol. plus 10% excess) of triethylamine, 1.02 g. (2 mol.) of acetic anhydride and 25 ml. of pyridine was heated at the refluxing temperature for 10 minutes. The reaction mixture was stirred in methanol, and after chilling the solid was collected on a filter and washed with methanol. The solid was stirred in hot pyridine, the suspension was filtered hot, and the solid that was collected on the filter was washed with methanol. The dye was dissolved in hot cresol, the solution was filtered, methanol was added, and after chilling the dye was collected on a filter and washed with methanol. After another such purification, the yield of dye was 2%. The dark crystals had a M.P. of 298–299° C. with decomposition.

It has also been found that the intermediates represented by Formula II above can be condensed with 4,6-dimethyl-5-ethoxycarbonyl-2H-pyran-2-one to give dyes somewhat related to those represented by Formula I above. The condensation involves the 2-methyl group of the pyran compound. For instance, replacement of the pyran intermediate of Example 8 by a molecularly equivalent amount of 4,6-dimethyl-5-ethoxycarbonyl-2H-pyran-2-one leads to the formation of a compound represented by the following formula:

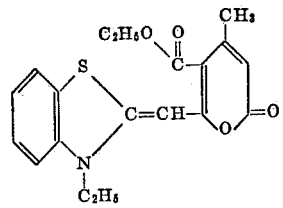

Other intermediates illustrated in the above examples can also be reacted with the afore-mentioned pyran-2-one compound.

The ethoxycarbonyl group of the compounds mentioned above can be removed by simple hydrolysis and decarboxylation. The method of hydrolyzing such groups is shown in the following two examples:

*Example 37.—3-ethyl-2-(3,5,5-trimethyl-2-cyclohexen-1-ylidene)-methylbenzothiazolium iodide*

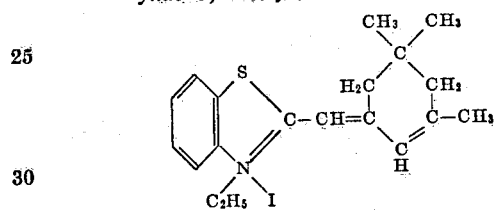

2-[3-(1-carbethoxy - 1 - cyanomethylene)-5,5-dimethyl-1-cyclohexen-1-yl]methylene-3-ethylbenzothiazoline (1.32 g., 1 mol.) and water (5 ml.) were dissolved in 30% hydrobromic acid in acetic acid (20 ml.) and heated under reflux for four hours. The reaction mixture was then concentrated to dryness under reduced pressure on the steam bath. The residue was dissolved in methanol (15 ml.), filtered and the filtrate precipitated with ether. The solid was dissolved in boiling water (15 ml.) and the product precipitated by the addition of sodium iodide (2 g.). After chilling, the crude product was filtered off, stirred with acetone, filtered and dried. After recrystallization from water, the yield of pure product was 0.75 g. (53%) M.P. 237–8° C. decomposition. The melting point showed no depression on mixing with an authentic sample prepared by the condensation of isophorone and 2-methylbenzothiazole ethiodide.

*Example 38.—3-ethyl - 2 - (2-phenylpropenyl)benzothiazolium iodide*

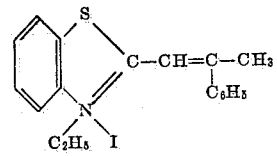

2-(3-carbethoxy - 3 - cyano-2-phenylallylidene)-3-ethylbenzothiazoline (Kendall, Suggate, and Mayo, British Patent 704,840, published March 3, 1954) (2 g., 1 mol.), was dissolved in concentrated hydrochloric acid and heated under reflux for one hour. The reaction mixture was evaporated to dryness under reduced pressure on the steam bath and the residue extracted with boiling water (15 ml.). The aqueous solution was filtered and the crude product precipitated from the filtrate by the addition of sodium iodide (5 g.). After chilling, the product was filtered off, stirred with acetone, chilled and filtered. After recrystallization from water, the yield was 1.10 g. (52%) M.P. 189–90° C. with decomposition. A mixture of this sample and an authentic sample prepared by the direct condensation of acetophenone and 3-ethyl-2-methylbenzothiazolium iodide showed no depression of the melting point.

As shown in the above examples, many of the dyes of our invention are particularly useful in manufacturing photographic, silver halide emulsions, serving to alter the sensitivity thereof. Sensitization by means of our new dyes is, of course, directed primarily to the ordinarily-employed, gelatino-silver-halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Pyridine has proven satisfactory as a solvent for the majority of our new dyes.

The concentration of our new dyes in the emulsion can vary widely, i.e., from about 5 to about 200 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in pyridine or other suitable solvent and a volume of this solution (which may be diluted with methanol) containing from 5 to 200 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromoiodide) emulsions. With fine-grain emulsions, which include most of the ordinarily-employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of our invention comprise the customarily-employed gelatino-silver-chloride, gelatino-silver-chloro bromide, gelatino-silver-bromide, and gelatino-silver-bromoiodide developing-out emulsions.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents, W. D. Baldsiefen, 2,540,085, granted February 6, 1951; R. E. Damschroder, 2,597,856, granted May 27, 1952, and H. C. Yutzy et al. 2,597,915, granted May 27, 1952), various palladium compounds, such as palladium chloride (W. D. Baldsiefen, U.S. 2,540,086, granted February 6, 1951), potassium chloropalladate (R. E. Stauffer et al., U.S. 2,598,079, granted May 27, 1952), etc., or mixture of such sensitizers; antifoggants, such as ammonium chloroplatinate (A.P.H. Trivelli et al., U.S. 2,566,245, granted August 28, 1951), ammonium chloroplatinite (A.P.H. Trivelli et al., U.S. 2,566,263, granted August 28, 1951), benzotriazole, nitrobenzimidazole, 5-nitroindazole, benzidine, mercaptans, etc. (see Mees—"The Theory of the Photographic Process," Macmillan Pub., 1942, page 460), or mixtures thereof; hardeners, such as formaldehyde (A. Miller, U.S. 1,763,533, granted June 10, 1930), chrome alum (U.S. 1,763,533), glyoxal (J. Brunken, U.S. 1,870,354, granted August 9, 1932), dibromacrolein (O. Block et al., British 406,750, accepted March 8, 1934), etc.; color couplers, such as those described in I. F. Salminen et al., U.S. Patent 2,423,730, granted July 7, 1947, Spence and Carroll, U.S. Patent 2,640,776, issued June 2, 1953, etc.; or mixtures of such addenda. Dispersing agents for color couplers, such as those set forth in U.S. patents, E. E. Jelley et al., 2,322,027, granted June 15, 1943, and L. D. Mannes et al., 2,304,940, granted December 15, 1942, can also be employed in the above-described emulsions.

The accompanying drawing further illustrates our invention. Each figure is a diagrammatic reproduction of a spectrogram showing the sensitivity of an ordinary gelatino-silver-bromiodide emulsion containing one of our sensitizing dyes. In Figure 1, the curve depicts the sensitivity of an ordinary gelatino-silver-bromiodide emulsion containing 4-dicyanomethylene-2-[(3-ethyl-2(3H)-benzothiazolylidene)methyl] - 6-methyl - 4H - pyran. The preparation of this dye is illustrated in Example 8 above. In Figure 2, the curve depicts the sensitivity of an ordinary gelatino-silver-bromiodide emulsion containing 4-dicyanomethylene - 2 - methyl - 6 - [(1,3,3 - trimethyl-2(3H)-indolylidene)propenyl]-4H-pyran. The preparation of this dye is illustrated in Example 12 above. In Figure 3, the curve represents the sensitivity of an ordinary gelatino-silver-bromiodide emulsion containing 1,3-diethyl - 5 - {2 - [(1 - ethyl - 2(1H) - naphtho[1,2]thiazolylidene) - propenyl] - 6 - methyl - 4H - pyran - 4-ylidene}barbituric acid. The preparation of this dye is illustrated in Example 22 above.

The invention has been described in detail with particular reference to preferred embodiments thereof, but it will be understood that variations and modifications can be effected within the spirit and scope of the invention as described hereinabove and as defined in the appended claims.

What we claim as our invention and desire secured by Letters Patent of United States is:

1. A photographic silver halide emulsion sensitized with a polymethine dye selected from those represented by the following general formula:

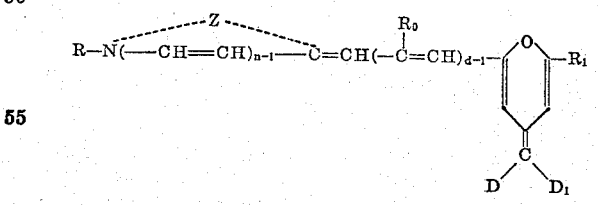

wherein R represents an alkyl group containing from 1 to 4 carbon atoms, $R_0$ and $R_1$ each represents a member selected from the group consisting of a hydrogen atom, an alkyl group containing from 1 to 2 carbon atoms and a monocyclic aryl group of the benzene series, $n$ and $d$ each represents a positive integer of from 1 to 2, D represents a member selected from the group consisting of a cyano group and radicals which, together with and bonded to $D_1$, represent the non-metallic atoms necessary to complete a nucleus selected from the group consisting of a pyrazolinone nucleus, an isoxazolinone nucleus, an oxindole nucleus, a 2,4,6-triketohexahydropyrimidine nucleus, a rhodanine nucleus, a 2-thio-2,4-oxazolidinedione nucleus, a thianaphthenone nucleus, a 2-thio-2,5-thiazolidinedione nucleus, a 2,4-thiazolidinedione nucleus, a thiazolidinone nucleus, a 4-thiazolinone nucleus, a 2-imino-2-oxazolin-4-one nucleus, a 2,4-imidazolidinedione nucleus, a 2-thio-2,4-imidazolidinedione nucleus, and a 2-imidazolin-5-one nucleus, $D_1$ represents a cyano group when D represents a cyano group, and Z represents the non-metallic atoms necessary to complete a heterocyclic nucleus selected from the group consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a benzimidazole nucleus, a 3,3-dialkylindolenine nucleus, a 2-pyridine nucleus and a 4-pyridine nucleus.

2. A photographic silver halide emulsion, as defined in claim 1, wherein the silver halide is silver bromiodide.

3. A photographic silver halide emulsion, as defined in claim 1, wherein the silver halide is silver chlorobromide.

4. A photographic silver halide emulsion sensitized with a polymethine dye selected from those represented by the following general formula:

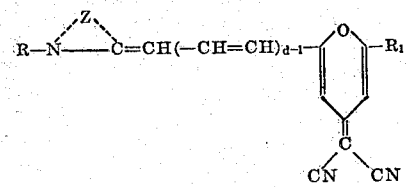

wherein R represents an alkyl group containing from 1 to 4 carbon atoms, $R_1$ represents a member selected from the group consisting of a hydrogen atom, an alkyl group containing from 1 to 2 carbon atoms and a monocyclic aryl group of the benzene series, d represents a positive integer of from 1 to 2 and Z represents the non-metallic atoms necessary to complete a benzothiazole nucleus.

5. A photographic silver halide emulsion sensitized with 4-dicyanomethylene-2-[(3-ethyl-2(3H)-benzothiazolylidene)-methyl]-6-methyl-4H-pyran.

6. A photographic silver halide emulsion sensitized with a polymethine dye selected from those represented by the following general formula:

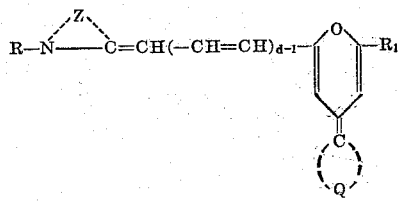

wherein R represents an alkyl group containing from 1 to 4 carbon atoms, $R_1$ represents a member selected from the group consisting of a hydrogen atom, an alkyl group containing from 1 to 2 carbon atoms and a monocyclic aryl group of the benzene series, d represents a positive integer of from 1 to 2, Q represents the non-metallic atoms necessary to complete a 2,4,6-triketohexahydropyrimidine nucleus, and Z represents the non-metallic atoms necessary to complete a benzothiazole nucleus.

7. A photographic silver halide emulsion sensitized with 1,3-diethyl-5-{2-[(3-ethyl-2(3H)-benzothiazolylidene)methyl]-6-methyl-4H-pyran-4-ylidene}barbituric acid.

8. A photographic silver halide emulsion sensitized with a polymethine dye selected from those represented by the following general formula:

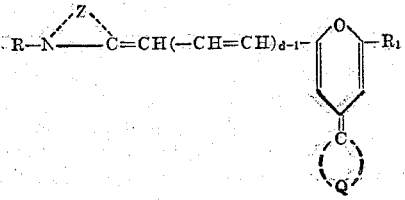

wherein R represents an alkyl group containing from 1 to 4 carbon atoms, $R_1$ represents a member selected from the group consisting of a hydrogen atom, an alkyl group containing from 1 to 2 carbon atoms and a monocyclic aryl group of the benzene series, d represents a positive integer of from 1 to 2, Q represents the non-metallic atoms necessary to complete a 2,4,6-triketohexahydropyrimidine nucleus, and Z represents the non-metallic atoms necessary to complete a benzoxazole nucleus.

9. A photographic silver halide emulsion sensitized with 1,3-diethyl-5-{2-[(3-ethyl-2(3H)-benzoxazolylidene)-propenyl]-6-methyl-4H-pyran-4-ylidene}barbituric acid.

10. A photographic silver halide emulsion sensitized with the polymethine dye selected from those represented by the following general formula:

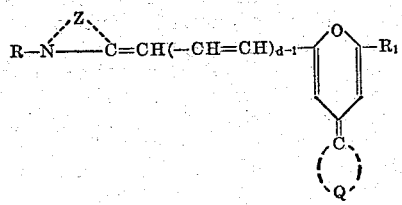

wherein R represents an alkyl group containing from 1 to 4 carbon atoms, $R_1$ represents a member selected from the group consisting of a hydrogen atom, an alkyl group containing from 1 to 2 carbon atoms and a monocyclic aryl group of the benzene series, d represents a positive integer of from 1 to 2, Q represents the non-metallic atoms necessary to complete an isoxazolinone nucleus, and Z represents the non-metallic atoms necessary to complete a 3,3-dialkylindolenine nucleus.

11. A photographic silver halide emulsion sensitized with 4-{2-methyl-[(1,3,3-trimethyl-2(3H)-indolylidene)-propenyl]-4H-pyran-4-ylidene}-3-phenyl-2-isoxazolin-5-one.

12. A photographic silver halide emulsion sensitized with a polymethine dye selected from those represented by the following general formula:

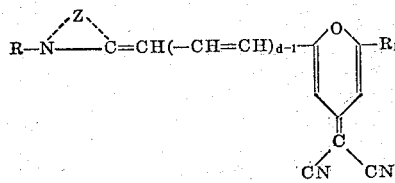

wherein R represents an alkyl group containing from 1 to 4 carbon atoms, $R_1$ represents a member selected from the group consisting of a hydrogen atom, an alkyl group containing from 1 to 2 carbon atoms and a monocyclic aryl group of the benzene series, d represents a positive integer of from 1 to 2, and Z represents the non-metallic atoms necessary to complete a 2-quinoline nucleus.

13. A photographic silver halide emulsion sensitized with 4-dicyanomethylene-2-[(1-ethyl-2(1H)-quinolylidene)propenyl]-6-methyl-4H-pyran.

References Cited in the file of this patent
UNITED STATES PATENTS

| | | |
|---|---|---|
| 2,170,805 | Brooker | Aug. 29, 1939 |
| 2,610,181 | Hayes | Sept. 9, 1952 |
| 2,691,581 | Knott | Oct. 12, 1954 |
| 2,773,869 | Leavitt | Dec. 11, 1956 |

OTHER REFERENCES

Chemical Abstracts, 16, 3101 (Abstract of Brit. Med. Journal, 1922, I, 514-5).

Chemical Abstracts, 19, 530 (Abstract of Proc. Roy. Soc., London, 96B, 317-33, 1924).

Wizinger et al.: Helv. Chim. Acta., 39, 217-22 (1956).